United States Patent
Hickenbottom et al.

(10) Patent No.: US 8,955,188 B2
(45) Date of Patent: Feb. 17, 2015

(54) SWEEPER DRIVE ASSEMBLY

(75) Inventors: Ronald Hickenbottom, Sullivan, IL (US); Doug Moore, Sullivan, IL (US)

(73) Assignee: Agri-Fab, Inc., Sullivan, IL (US)

( * ) Notice: Subject to any disclaimer, the term of this patent is extended or adjusted under 35 U.S.C. 154(b) by 172 days.

(21) Appl. No.: 13/450,965

(22) Filed: Apr. 19, 2012

(65) Prior Publication Data

US 2013/0276249 A1 Oct. 24, 2013

(51) Int. Cl.
*A46B 13/00* (2006.01)

(52) U.S. Cl.
USPC ........... 15/82; 15/78; 15/83; 15/79.1; 15/79.2

(58) Field of Classification Search
USPC ................................ 15/79.1, 79.2, 82–86, 78
See application file for complete search history.

(56) References Cited

U.S. PATENT DOCUMENTS

| | | | |
|---|---|---|---|
| 220,413 A | 10/1879 | Pittman | |
| 283,415 A | 8/1883 | Passmore | |
| 336,728 A | 2/1886 | Mack | |
| 640,477 A * | 1/1900 | Maxon | 15/83 |
| 850,777 A | 4/1907 | Mosher | |
| 1,304,439 A | 5/1919 | Yznaga | |
| 1,580,600 A | 12/1923 | Holbrook | |
| 2,561,500 A | 7/1951 | D'Astici | |
| 2,737,673 A | 3/1956 | Parker et al. | |
| 3,271,939 A | 9/1966 | Granger et al. | |
| 3,823,435 A * | 7/1974 | Rhodes et al. | 15/79.1 |
| 4,960,006 A | 10/1990 | Moore | |
| 5,524,425 A | 6/1996 | Gallazzini | |
| 5,873,995 A | 2/1999 | Huang et al. | |
| 2007/0107404 A1* | 5/2007 | Hickenbottom et al. | 56/17.2 |
| 2009/0235472 A1* | 9/2009 | Johnson et al. | 15/83 |
| 2009/0241275 A1 | 10/2009 | Johnson et al. | |

* cited by examiner

*Primary Examiner* — Monica Carter
*Assistant Examiner* — Stephanie Berry
(74) *Attorney, Agent, or Firm* — Vedder Price P.C.

(57) ABSTRACT

A lawn sweeper including a swing arm rotatably connected to a wheel axle including a first end connected to a biasing element and a second end including a rotatably connected idler gear that meshingly engages a wheel gear in a first position and is disengaged from the wheel gear in a second position.

16 Claims, 8 Drawing Sheets

SWEEPER DRIVE ASSEMBLY

FIELD OF DISCLOSURE

The present disclosure generally relates to a lawn sweeper assembly, and more particularly, to a drive assembly for a brush of a lawn sweeper that may be selectively disengaged from the ground engaging wheels.

BACKGROUND

Lawn sweeping is a conventional technique used by many homeowners, gardeners, and groundskeepers to collect unwanted debris from a lawn. Such unwanted debris may include, for example, grass clippings, leaves (mulched or whole), and/or pine needles. A well groomed lawn gives a good first impression, whether the well groomed lawn is associated with a business or a home. Furthermore, a well groomed lawn is part of living the "American dream." For these reasons, among others, a need exists, for an improved lawn sweeper for collecting debris from a lawn.

Lawn sweepers are used in various ways for maintaining a well-groomed lawn. For example, groundskeepers will often mow a lawn, thereby creating grass clippings and autumn-shed leaves. In some instances, mulching the leaves is preferred, as many people are required to compact and bag their lawn refuse for pickup. Thus, a groundskeeper may even make multiple passes to further mulch the leaves and other lawn debris.

Current lawn sweepers generally include an assembly that connects the brush and the ground engaging wheels in order to rotate the brush at a increased pace that is a pre-selected ratio with respect to the rotation of the ground engaging wheels. One type of such assembly uses a pair of sprockets or gears that have different tooth counts and are connected by a chain to drive the brush at the desired pre-selected higher speed ratio. Other types of such assemblies have an idler gear that meshingly engages teeth formed on the ground engaging wheel and the brush shaft in order to provide the desired pre-selected higher speed ratio. The disadvantages of these assemblies are mainly that such assemblies are difficult to assemble and expensive to produce, and the ground speed at which the sweeper may be moved is limited so as to prevent damage to the brush or the associated drive assembly.

The disadvantages of current lawn sweeper assemblies outlined above, among other things, are overcome by a free-wheel drive assembly with that may be easily used in connection with a lawn sweeper assembly and enable disengagement of the brush from the ground engaging wheels.

Therefore, there is a need in the art for a lawn sweeper free-wheel drive assembly that overcomes the disadvantages of the prior art and provides the advantages as described in this disclosure.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

DETAILED DESCRIPTION

Figure 1:
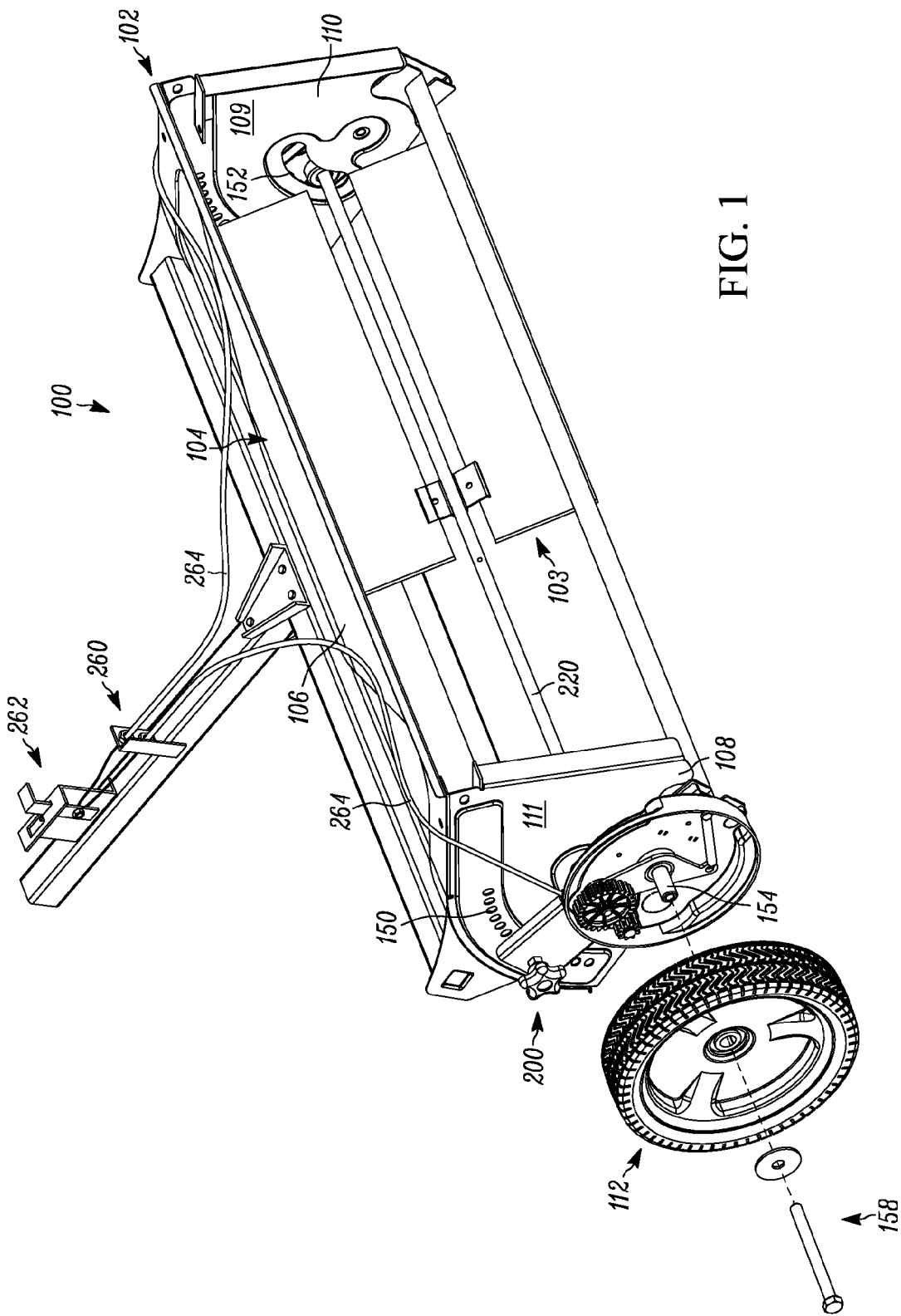
FIG. 1 is a partially exploded view of a lawn sweeper in accordance with one embodiment of the present disclosure.

The present disclosure is not limited to the particular details of the apparatus depicted, and other modifications and applications may be contemplated. Further changes may be made in the apparatus, device or methods without departing from the true spirit of the scope of the disclosure herein involved. It is intended, therefore, that the subject matter in this disclosure should be interpreted as illustrative, not in a limiting sense.

In one aspect of the present disclosure, a lawn sweeper may include a housing having a central portion and an end panel including a plurality of spaced apertures and a slot. A wheel axle may be connected to the end panel and a ground engaging wheel that may include a wheel gear formed on an inner diameter. A brush height adjustment assembly may be rotatably connected to the wheel axle and include an arm. One end of the arm may include a connection device to selectively engage one of the apertures. A brush shaft may be rotatably connected to the arm and may include a drive gear. A swing arm may be rotatably connected to the wheel axle and may be connected to a biasing element and include a rotatably connected idler gear that meshingly engages the wheel gear. The swing arm may be movable between a first position defined by the idler gear meshingly engaging the drive gear and a second position defined by the idler gear disengaged from the drive gear.

In yet other aspects of the present disclosure, a lawn sweeper may include a housing having a central portion and an end panel including a plurality of spaced apertures and a slot. A brush shaft may include a first end rotatably connected to the end panel and a drive gear. A sweeper height adjustment assembly may be rotatably connected to the brush shaft and include an arm having a first end that may be connected to a cross bar adapted for connection to a height adjuster. A wheel axle may be fixedly connected to the arm between the first end and the brush shaft that includes a rotatably connected ground engaging wheel that has a wheel gear formed on an inner diameter. A swing arm may be rotatably connected to the wheel axle that includes a first end connected to a biasing element and a second end may have a rotatably connected idler gear that meshingly engages the wheel gear. The swing arm may be movable between a first position defined by the idler gear meshingly engaging the drive gear and a second position defined by the idler gear disengaged from the drive gear.

In another aspect of the present disclosure, a dust cover may be connected to the arm to enclose the swing arm and drive gear, a bearing element may be connected to the arm to receive the brush shaft therethrough, a control mechanism may be connected to the swing arm that is movable from an engagement position defined when the swing arm is disposed in the first position to a disengagement position defined when a force of the biasing element has been overcome by the control mechanism such that the swing arm is disposed in the second position and a second arm and second swing arm may be rotatably connected to an opposite wheel axle, similarly configured as the arm and swing arm, wherein the swing arm and the second swing arm are independently movable.

In other aspects of the present disclosure, the drive gear may be secured to a distal end of the brush shaft that extends through the bearing element, the biasing element may apply a force to the swing arm to normally dispose the swing arm in the first position and a control mechanism may be connected to the swing arm and the second swing arm so that each is movable from an engagement position to a disengagement position.

Figure 2:
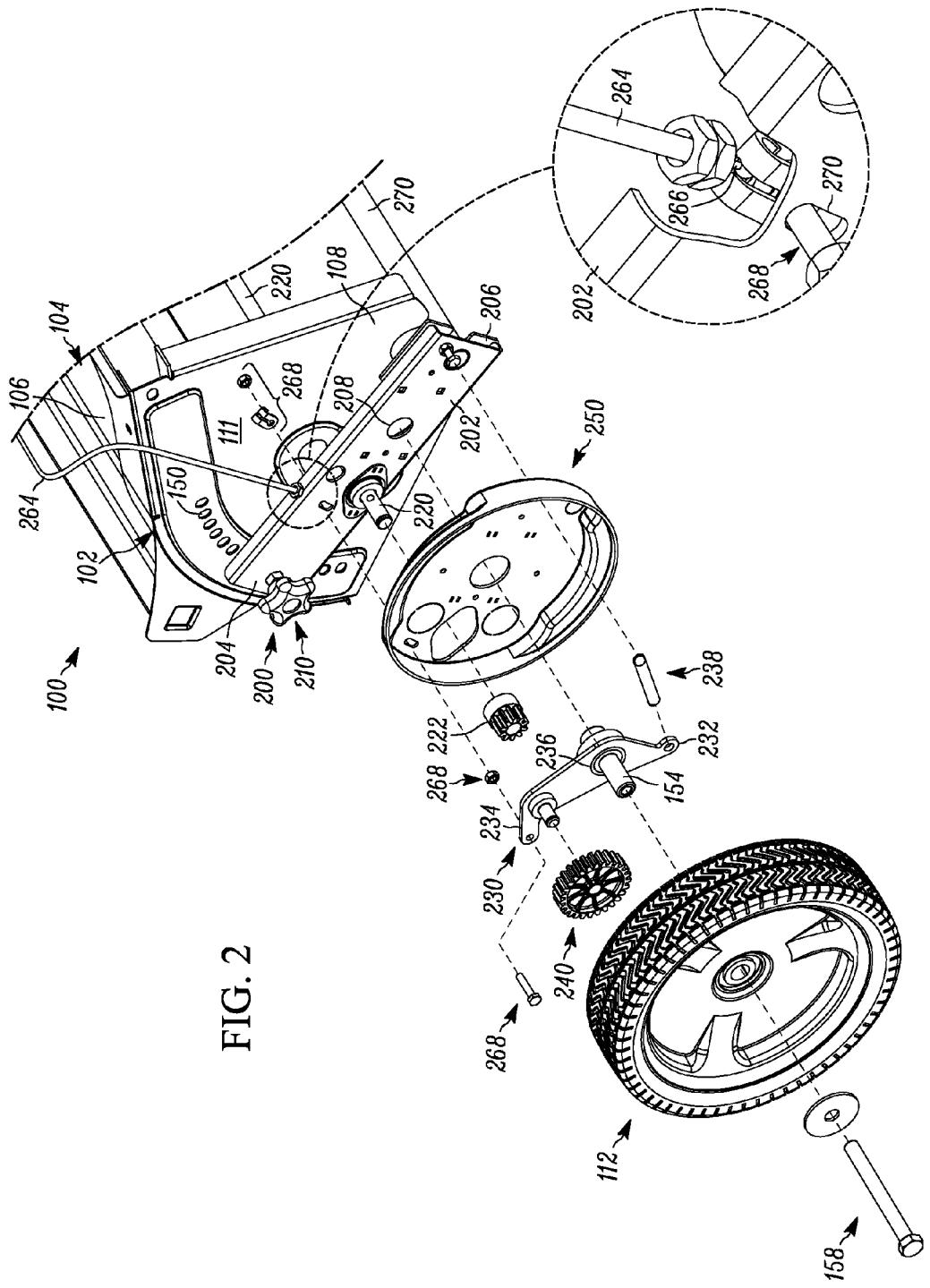
FIG. 2 is a detailed partially exploded view of the lawn sweeper of FIG. 1 including a highlighted partially cut-away view.

FIG. 1 is a partially exploded view of a lawn sweeper 100 in accordance with one embodiment of the present disclosure and FIG. 2 is a detailed partially exploded view of the lawn sweeper of FIG. 1 including a highlighted partially cut-away view. Lawn sweeper assembly 100 may include lawn sweeper unit 102 and hopper assembly (not shown, but the structure and functionality of which is understood by one of skill in the art), which in one example may be a hopper bag assembly (i.e., the hopper assembly may include a bag, although in other examples, the hopper assembly may include any suitable means for retaining collected debris, such as a more rigid plastic hopper or other suitable container as would be known to one of ordinary skill in the art, or as shown in US Patent Application Publication US 2009/0241275, which is incorporated herein by reference as if fully set forth herein).

The lawn sweeper unit 102 may include a housing 104, which includes a central portion 106, a first end panel 108, a second end panel 110 and a brush 103, which may include a singular or plurality of brush elements, connected to a brush shaft 220. The first and second end panels 108, 110 are disposed at opposite longitudinal ends of the central portion 106 of the housing 104 and contiguous with the central portion 106. In the embodiments shown in FIGS. 1-8, the central portion 106 may be configured as a front panel that forms a convex surface so as to define a front and top surface. The housing 104 may also include separate top panel and front panel of the central portion 106, if desired. Furthermore, the housing may be formed from a common mold defining the central portion 106 and end panels 108, 110 as an integral piece or as separate components. One having ordinary skill in the art will recognize other alternatives for forming housing 104. The first and second end panels 108, 110 each may include an interior surface 109 and an exterior surface 111 and a plurality of spaced apertures 150 and a slot 152. The plurality of apertures 150 may be formed along an arcuate or curved axis in order to facilitate the functionality of the brush height adjustment assembly as described herein. Likewise, the slot 152 may have an arcuate or curved axis in order to facilitate movement of a brush shaft as a result of the brush height adjustment assembly as described herein. The slot 152 may have any desirable configuration, such as, for example only, linear, angled, arcuate, semi-circular, serpentine, etc. or any other configuration necessary to provide the intended functionality.

Figure 3:
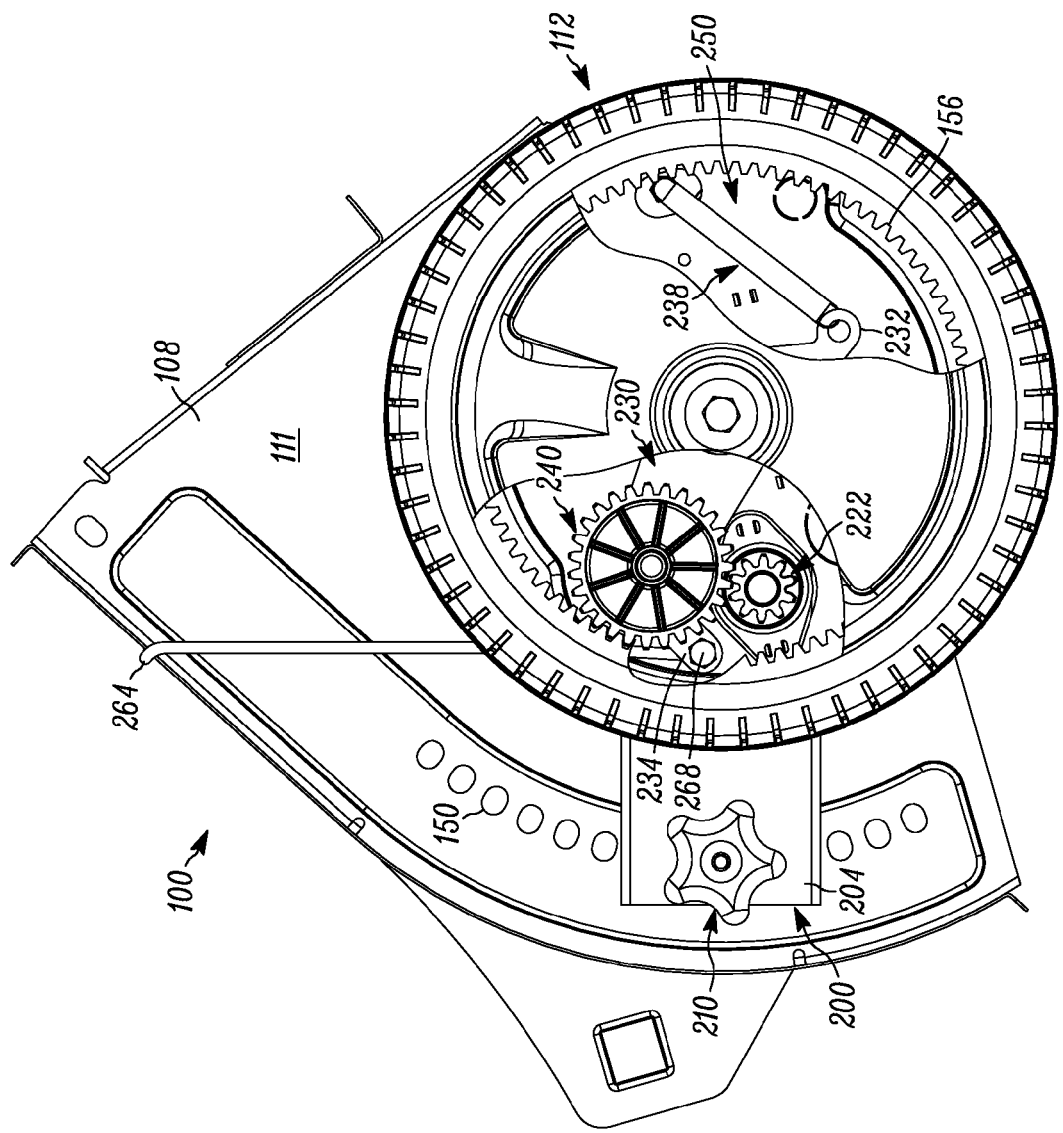
FIG. 3 is a partially cut-away side elevation view of the lawn sweeper of FIG. 1.
Figure 4:
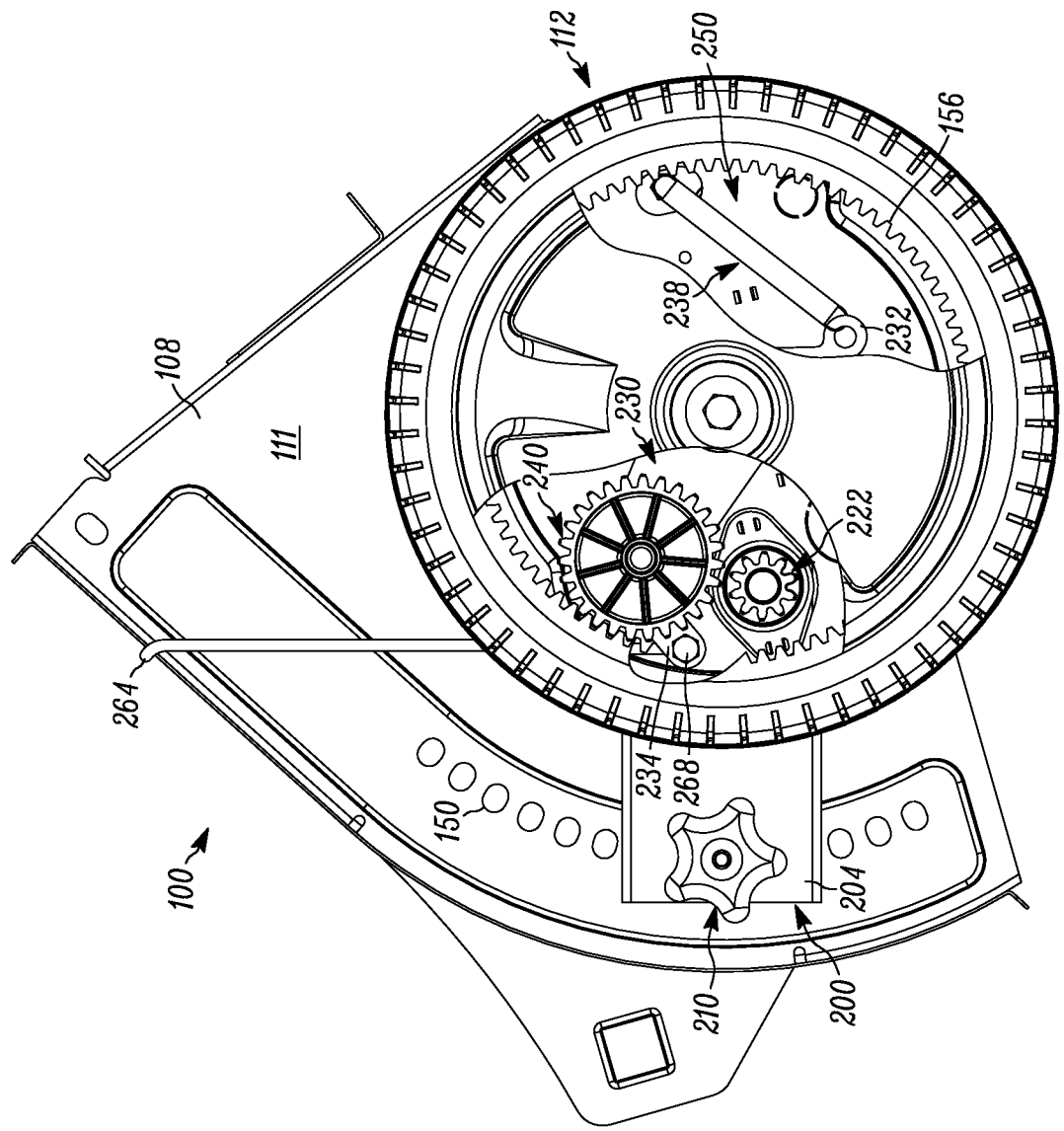
FIG. 4 is a partially cut-away side elevation view of the lawn sweeper of FIG. 1.

The lawn sweeper unit 102 may include a first ground engaging wheel 112 connected to the first side panel 108 adjacent to the exterior surface 111 of the housing 104 and a second ground engaging wheel (not shown, but understood by one of skill in the art) connected to the second side panel 110 adjacent to the exterior surface 111 of housing 104. The wheels may be connected to the end panels 108, 110 by any suitable means. For example, in one embodiment a wheel axle 154 may be connected to the end panel 108 and the wheel 112, which may include a center opening that is configured to receive the axle 154 to align, interface, connect, etc. the wheel 112 with the axle 154, is rotatably connected to the axle 154 by a conventional fastener or assembly 158, such as for example only, threaded fasteners, over-center latch, spine engagement, taper engagement, cotter pin, etc. Otherwise, the wheel 112 has a configuration like any other conventional wheel useful in connection with a lawn sweeper assembly, including a wheel gear 156 formed on an inner diameter of the wheel 112, as shown in FIGS. 3 and 4.

A brush height adjustment assembly 200 may be rotatably connected to the end panel 108 via the wheel axle 154 and may include an arm 202 having a first end 204 and a second end 206. In one embodiment, a shoulder may defined on the axle 154 that is configured to receive and engage an aperture 208 formed in the arm 202. The first end 204 may include a connection device 210 that may be configured to selectively engage one of the apertures 150 in a conventional manner. For example only, the connection device 210 may include a spring-loaded knob having a projecting pin, a threaded fastener, or the like, etc. that extend through the aperture 150 to secure the arm 202 in a desired orientation so that the brush is disposed at a desired height with respect to the ground. A brush shaft 220, that extends beyond one end panel 108 to beyond the other end panel 110, may be rotatably connected to the arm 202 between the first end 204 and the wheel axle 154 in a conventional manner, such as, for example only, via a movable or rotatable bearing mount or element, bushing, or the like, etc. that is connected to the arm 202 to receive the brush shaft 220 therethrough. The brush shaft 220 may also include a drive gear 222 connected to a distal end of the brush shaft 220 that extends through the mount, bearing element, etc. therefor and that is configured to engage and be driven by an idler gear as described herein.

A swing arm 230 may be rotatably connected to the end panel 108 via the wheel axle 154 and may include a first end 232 and a second end 234. In one embodiment, a shoulder may defined on the axle 154 that is configured to receive and engage an aperture 236 formed in the swing arm 230. The first end 232 may be connected to a biasing element 238 that is connected at an opposite end of the biasing element 238 to the arm 202. In one embodiment, the first end 232 includes an aperture that is engaged by a hook defined by one end of the biasing element 238 (that may be configured as a wound spring, flat spring, elastomeric element, or the like, etc.) and a post, projection, stand-off, or the like, etc. (such as, for example only, a threaded fastener or the like, etc.) that is secured to the arm 202 is engaged by a similar structure formed on the opposite end of the biasing element 238. Preferably, the biasing element 238 applies a force to the swing arm 230 in order to normally dispose the swing arm 230 in the first position, as described herein. The second end 234 may include a rotatably connected idler gear 240 that meshingly engages the wheel gear 156, as best shown in FIGS. 3 and 4. In one embodiment, the idler gear 240 may be connected to the swing arm 230 in any suitable manner, such as, for example only, a movable or rotatable bearing mount, bushing, axle, threaded fastener, over-center latch, cotter pin, or the like, etc.

In one embodiment, a dust cover 250 may be connected to the arm 202 to enclose the swing arm 230, drive gear 222 and idler gear 240 from exposure to damaging environmental effects as much as possible to thereby extend the potential life of the lawn sweeper 100 or any associated service intervals.

In use, as shown in FIGS. 3 and 4, the swing arm 230 may be movable between a first position (FIG. 3) and a second position (FIG. 4), wherein the first position is defined by the idler gear 240 meshingly engaging the drive gear 222 and the second position is defined by the idler gear 240 disengaged from the drive gear 222. In order to facilitate such movement, in one embodiment, a control assembly or mechanism 260 may be connected to the second end 234 of the swing arm 230 that is movable from an engagement position (FIG. 3) to a disengagement position (FIG. 4), wherein the engagement position defined when the swing arm 230 is disposed in the first position and retain in such first position by the force of the biasing element 238, and the disengagement position defined when a force of the biasing element 238 has been overcome by the control mechanism 260 such that the swing arm 230 is disposed in the second position. In one embodiment, the control assembly or mechanism 260 may include an actuation device 262, such as, for example only, a lever, handle, knob, solenoid, linkage, or the like, etc., that is connected to a first end of a link, cable, wire, rod, or the like, etc. 264 such that an opposite end may be connected to the second end 234 (which may include an aperture or other similar structure to facilitate such connection) of the swing arm 230. In one embodiment, the link 264 may include a sheath and an inner cable, a Bowden cable, or the like, etc. and the opposite end may be secured to the arm 202 such that the inner cable 266 is connected in a conventional manner to the arm 202, such as by a threaded fastener assembly 268. A slot 270 may be provided in the arm 202 to permit the desired movement of the swing arm 230 with respect to the arm 202 upon movement of the actuation device 262.

The detailed description above with respect to FIGS. 1-4 identifies the structure and associated functionality of only one side of one embodiment of the lawn sweeper 100 of this disclosure, which one of skill in the art will recognize is all that may be necessary for this disclosure to function as intended. However, in another embodiment, a cross bar 270 may interconnect with the structure on the opposite side of the lawn sweeper 100 that is similar or identical to that described above in order to provide more robust functionality and longevity. Consequently, for the sake of brevity, all of the detailed description of the second side will not be repeated as they are basically the same as described above save for different orientation because of the mirror image alignment, as would be understood by one of skill in the art. Therefore, one of skill in the art will recognize that there is a second arm including a first end, an opposite wheel axle, an opposite end panel, an opposed longitudinal end of the central portion, a second drive gear connected to the brush shaft, a second swing arm movable between a first position and a second position, a second biasing element, a second idler gear, a second gear wheel, the control mechanism connected to the second swing arm that is movable from an engagement position to a disengagement position as described herein, and wherein the swing arm and the second swing arm are independently movable.

Figure 5:
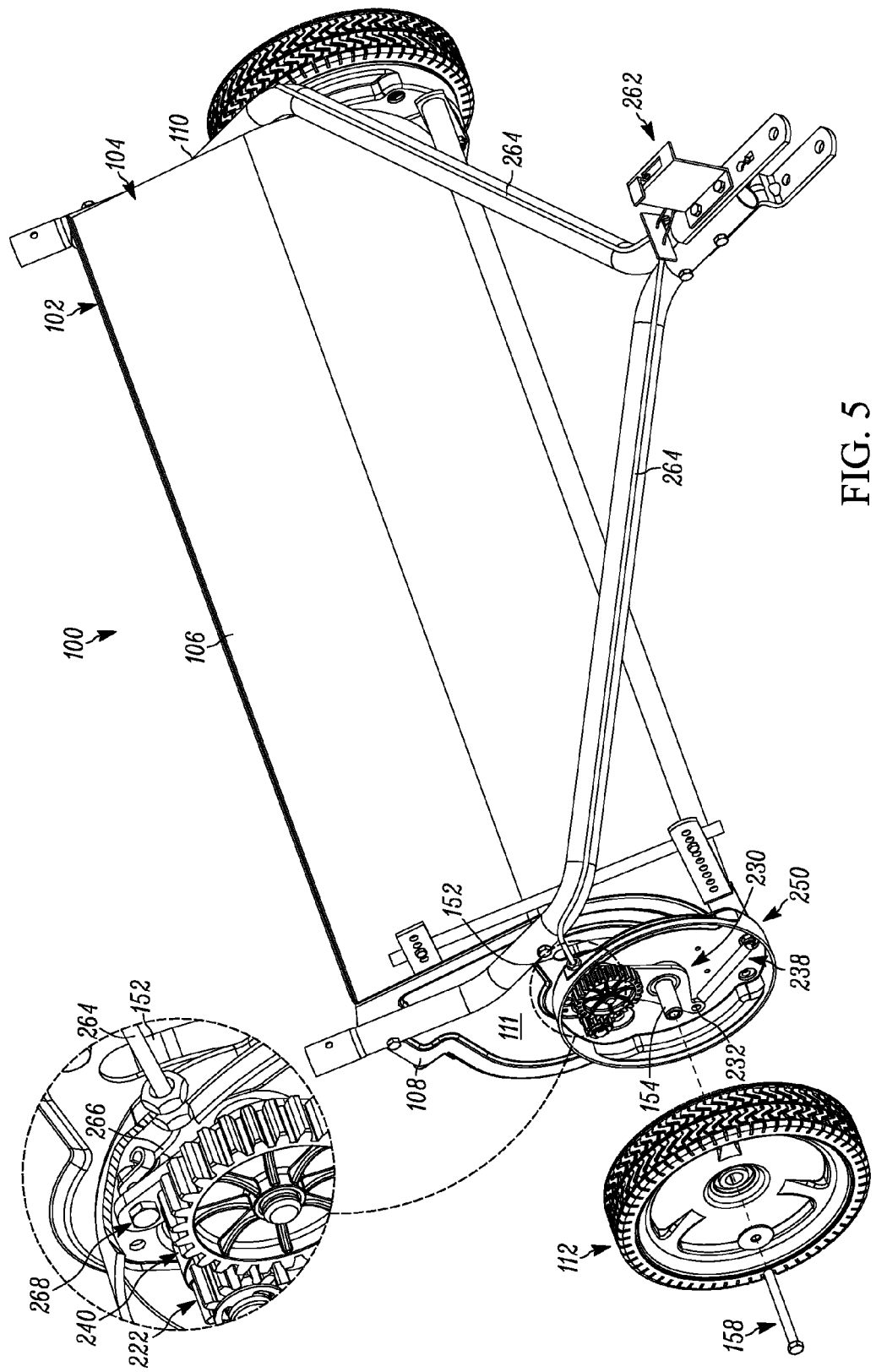
FIG. 5 is a partially exploded view of a lawn sweeper in accordance with another embodiment of the present disclosure including a highlighted partially cut-away view.
Figure 6:
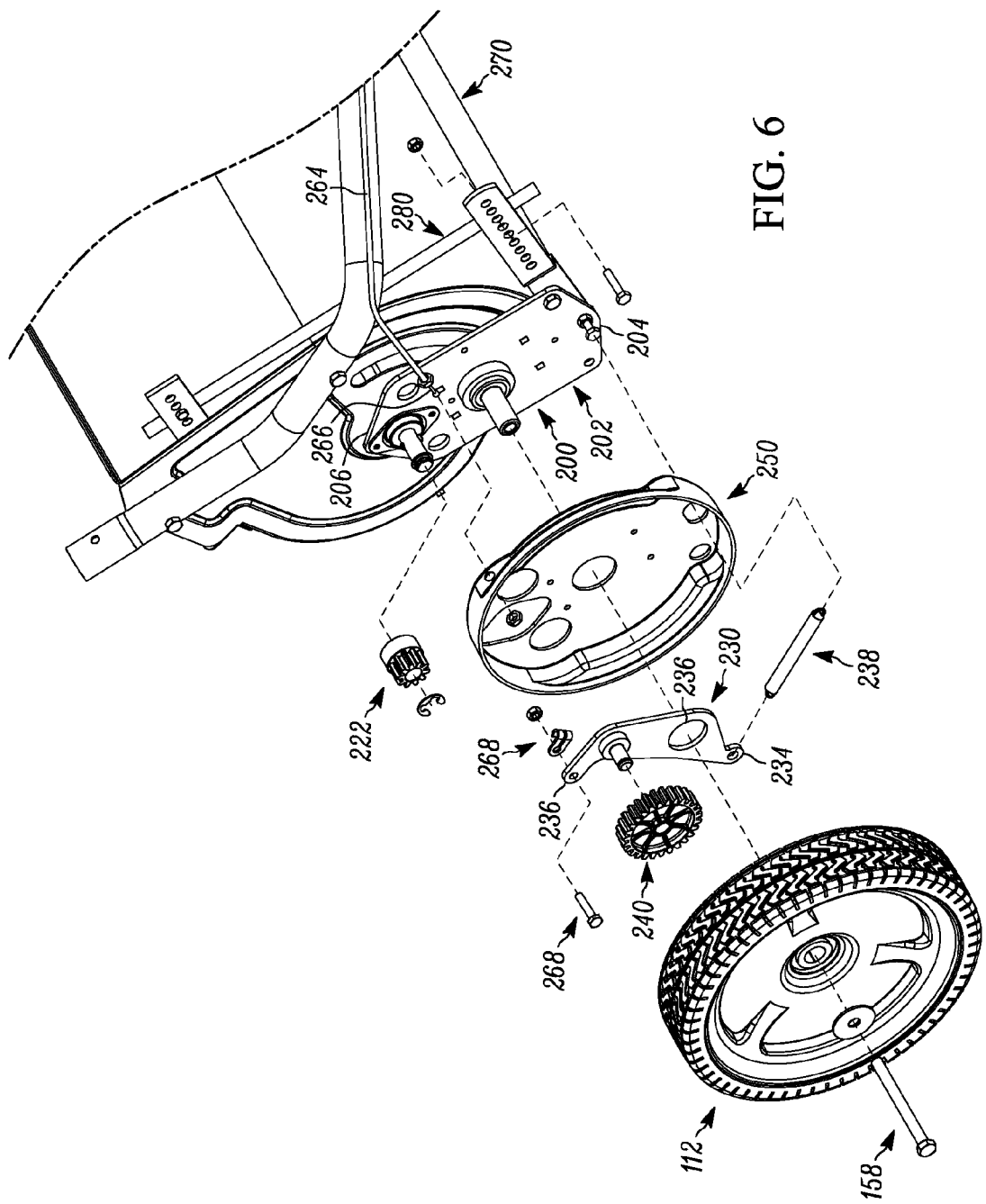
FIG. 6 is a detailed partially exploded view of the lawn sweeper of FIG. 5.

FIG. 5 is a partially exploded view of a lawn sweeper in accordance with another embodiment of the present disclosure including a highlighted partially cut-away view and FIG. 6 is a detailed partially exploded view of the lawn sweeper of FIG. 5. Lawn sweeper assembly 100 may include lawn sweeper unit 102 and hopper assembly (not shown, but the structure and functionality of which is understood by one of skill in the art), which in one example may be a hopper bag assembly (i.e., the hopper assembly may include a bag, although in other examples, the hopper assembly may include any suitable means for retaining collected debris, such as a more rigid plastic hopper or other suitable container as would be known to one of ordinary skill in the art, or as shown in US Patent Application Publication US 2007/0107404, which is incorporated herein by reference as if fully set forth herein).

The lawn sweeper unit 102 may include a housing 104, which includes a central portion 106, a first end panel 108, a second end panel 110 and a brush, which may include a singular or plurality of brush elements, connected to the brush shaft (not shown but the same as described herein). The first and second end panels 108, 110 are disposed at opposite longitudinal ends of the central portion 106 of the housing 104 and contiguous with the central portion 106. The housing 104 may also include separate top panel and front panel of the central portion 106, if desired. Furthermore, the housing may be formed from a common mold defining the central portion 106 and end panels 108, 110 as an integral piece or as separate components. One having ordinary skill in the art will recognize other alternatives for forming housing 104. The first and second end panels 108, 110 each may include an interior surface and an exterior surface 111 and a slot 152. The slot 152 may have an arcuate or curved axis in order to facilitate movement of a wheel axle as described herein, if necessary and entirely optional. The slot 152 may have any desirable configuration, such as, for example only, linear, angled, arcuate, semi-circular, serpentine, etc. or any other configuration necessary to provide the intended functionality.

Figure 7:
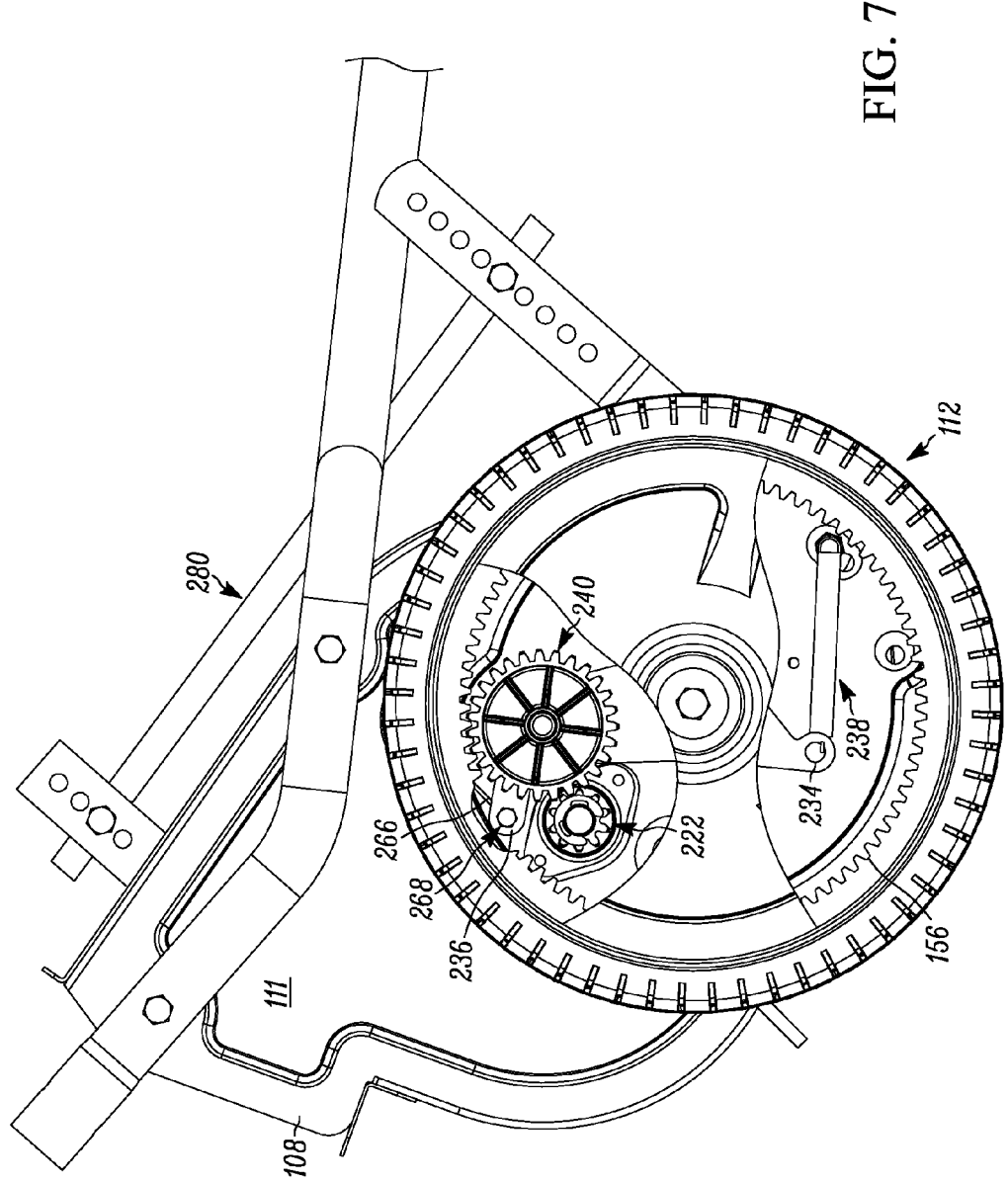
FIG. 7 is a partially cut-away side elevation view of the lawn sweeper of FIG. 5.
Figure 8:
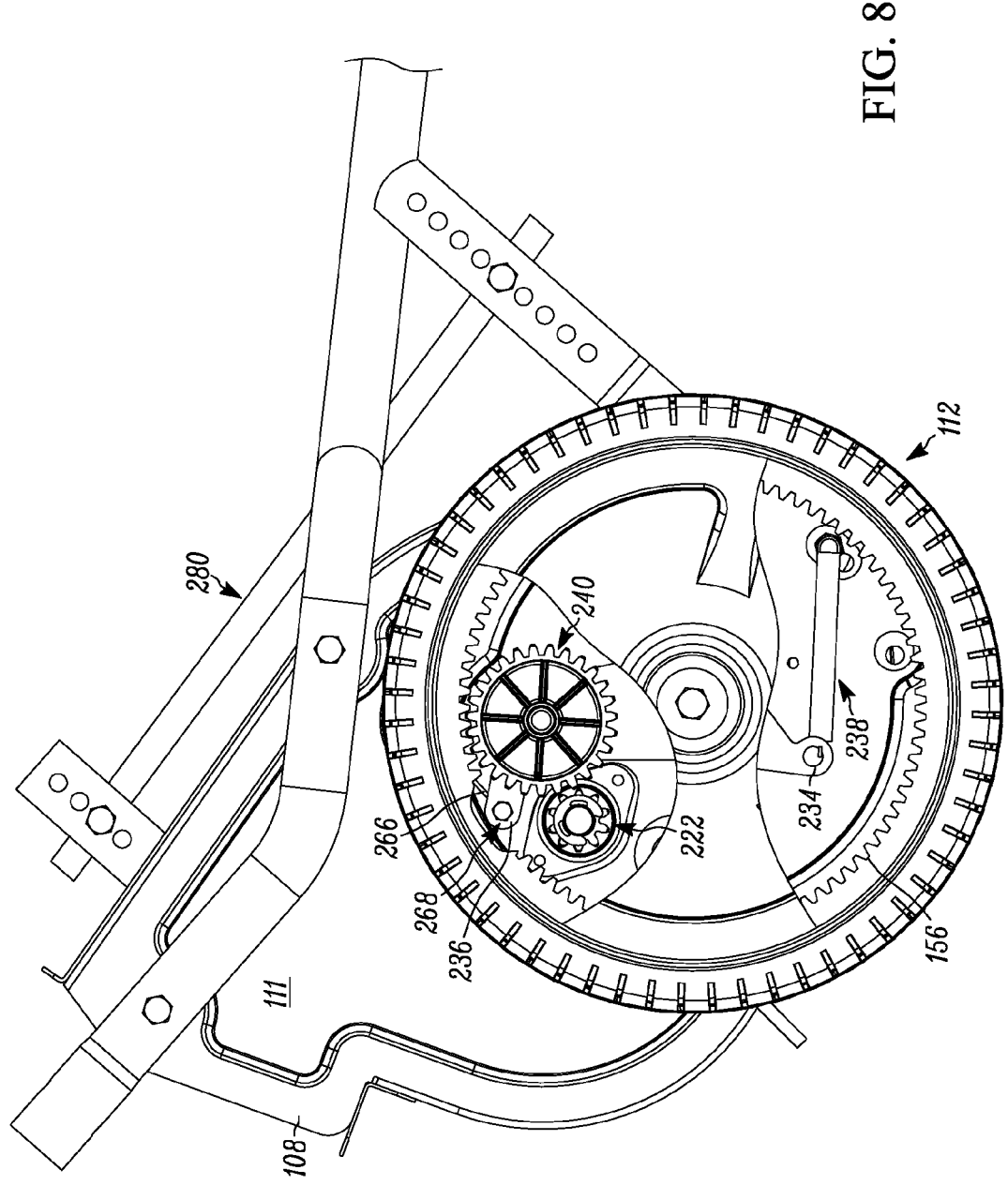
FIG. 8 is a partially cut-away side elevation view of the lawn sweeper of FIG. 5.

The lawn sweeper unit 102 may include a first ground engaging wheel 112 connected to the first side panel 108 adjacent to the exterior surface 111 of the housing 104 and a second ground engaging wheel connected to the second side panel 110 adjacent to the exterior surface 111 of housing 104. The wheels may be connected to the end panels 108, 110 by any suitable means. For example, in one embodiment a wheel axle 154 may be connected to the end panel 108 via a sweeper height adjustment assembly and the wheel 112, which may include a center opening that is configured to receive the axle 154 to align, interface, connect, etc. the wheel 112 with the axle 154, is rotatably connected to the axle 154 by a conventional fastener or assembly 158, such as for example only, threaded fasteners, over-center latch, spine engagement, taper engagement, cotter pin, etc. Otherwise, the wheel 112 has a configuration like any other conventional wheel useful in connection with a lawn sweeper assembly, including a wheel gear 156 formed on an inner diameter of the wheel 112, as shown in FIGS. 7 and 8.

A brush shaft 220, that extends beyond one end panel 108 to beyond the other end panel 110, may have a first end that is rotatably connected to the end panel 108 in a conventional manner, such as, for example only, via a movable or rotatable bearing mount or element, bushing, or the like, etc. that is connected to the end panel 108 to receive the brush shaft 220 therethrough. The brush shaft 220 may also include a drive gear 222 connected to a distal end adjacent the first end of the brush shaft 220 that extends through the mount, bearing element, etc. therefor and that is configured to engage and be driven by an idler gear as described herein.

A sweeper height adjustment assembly 200 may be rotatably connected to the brush shaft 220 and may include an arm 202 having a first end 204 and a second end 206. The first end 204 may be connected to a cross bar 270 adapted for connection to a height adjuster 280. In one embodiment, the height adjuster 280 may include bars, links, structure, elements, or the like, etc. configured to adjustably secure the cross bar 270 at a preselected position so that the wheel axle 154 may be adjusted so as to raise or lower the housing 104 with respect to the ground and thereby adjust the height of the brush shaft 220 and the attached brush to the ground as well. The wheel axle 154 may be fixedly connected to the arm 202 between the first end 204 and the brush shaft 220.

In one embodiment, a shoulder may defined on the axle 154 that is configured to receive and engage an aperture 208 formed in the arm 202. The first end 204 may include a connection device 210 that may be configured to selectively engage one of the apertures 150 in a conventional manner. For example only, the connection device 210 may include a spring-loaded knob having a projecting pin, a threaded fastener, or the like, etc. that extend through the aperture 150 to secure the arm 202 in a desired orientation so that the brush is disposed at a desired height with respect to the ground.

A swing arm 230 may be rotatably connected to the wheel axle 154 and may include a first end 232 and a second end 234. In one embodiment, a shoulder may defined on the axle 154 that is configured to receive and engage an aperture 236 formed in the swing arm 230. The first end 232 may be connected to a biasing element 238 that is connected at an opposite end of the biasing element 238 to the arm 202. In one embodiment, the first end 232 includes an aperture that is engaged by a hook defined by one end of the biasing element 238 (that may be configured as a wound spring, flat spring, elastomeric element, or the like, etc.) and a post, projection, stand-off, or the like, etc. (such as, for example only, a threaded fastener or the like, etc.) that is secured to the arm 202 is engaged by a similar structure formed on the opposite end of the biasing element 238. Preferably, the biasing element 238 applies a force to the swing arm 230 in order to normally dispose the swing arm 230 in the first position, as described herein. The second end 234 may include a rotatably connected idler gear 240 that meshingly engages the wheel gear 156, as best shown in FIGS. 7 and 8. In one embodiment, the idler gear 240 may be connected to the swing arm 230 in any suitable manner, such as, for example only, a movable or rotatable bearing mount, bushing, axle, threaded fastener, over-center latch, cotter pin, or the like, etc.

In one embodiment, a dust cover 250 may be connected to the arm 202 to enclose the swing arm 230, drive gear 222 and idler gear 240 from exposure to damaging environmental effects as much as possible to thereby extend the potential life of the lawn sweeper 100 or any associated service intervals.

In use, as shown in FIGS. 7 and 8, the swing arm 230 is movable between a first position (FIG. 7) and a second position (FIG. 8), the first position is defined by the idler gear 240 meshingly engaging the drive gear 220 and the second position is defined by the idler gear 240 disengaged from the drive gear 220. In order to facilitate such movement, in one embodiment, a control assembly or mechanism 260 may be connected to the second end 234 of the swing arm 230 that is movable from an engagement position (FIG. 7) to a disengagement position (FIG. 8), wherein the engagement position defined when the swing arm 230 is disposed in the first position and retain in such first position by the force of the biasing element 238, and the disengagement position defined when a force of the biasing element 238 has been overcome by the control mechanism 260 such that the swing arm 230 is disposed in the second position. In one embodiment, the control assembly or mechanism 260 may include an actuation device 262, such as, for example only, a lever, handle, knob, solenoid, linkage, or the like, etc., that is connected to a first end of a link, cable, wire, rod, or the like, etc. 264 such that an opposite end may be connected to the second end 234 (which may include an aperture or other similar structure to facilitate such connection) of the swing arm 230, see the detailed highlight of FIG. 5. In one embodiment, the link 264 may include a sheath and an inner cable, a Bowden cable, or the like, etc. and the opposite end may be secured to the arm 202 such that the inner cable 266 is connected in a conventional manner to the arm 202, such as by a threaded fastener assembly 268. A slot 270 may be provided in the arm 202 to permit the desired movement of the swing arm 230 with respect to the arm 202 upon movement of the actuation device 262.

The detailed description above with respect to FIGS. 5-8 identifies the structure and associated functionality of only one side of one embodiment of the lawn sweeper 100 of this disclosure, which one of skill in the art will recognize is all that may be necessary for this disclosure to function as intended. However, in another embodiment, the cross bar 270 may interconnect with the structure on the opposite side of the lawn sweeper 100 that is similar or identical to that described above in order to provide more robust functionality and longevity. Consequently, for the sake of brevity, all of the detailed description of the second side will not be repeated as they are basically the same as described above save for different orientation because of the mirror image alignment, as would be understood by one of skill in the art. Therefore, one of skill in the art will recognize that there is a second arm including a first end, an opposite wheel axle, an opposite end panel, an opposed longitudinal end of the central portion, a second drive gear connected to the brush shaft, a second swing arm movable between a first position and a second position, a second biasing element, a second idler gear, a second gear wheel, the control mechanism connected to the second swing arm that is movable from an engagement position to a disengagement position as described herein, and wherein the swing arm and the second swing arm are independently movable.

One of skill in the art will recognize that all the various components identified in this disclosure may be made from any material or combination of materials suitable for the expected structural load and environment for the cart 100 including, without limitation, metals, composites, engineered plastics, natural or synthetic materials, or the like, etc. Furthermore, such components may be formed in any conventional manner, such as by molding, casting, machining, cold or hot forming, forging or the like, etc. Still further, such components may be finished in any conventional manner, such as painting, powder coating, plating, or the like, etc. or may be unfinished.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:
1. A lawn sweeper comprising:
a housing including a central portion and an end panel at a longitudinal end of the central portion, the end panel including a plurality of spaced apertures and a slot;
a wheel axle connected to the end panel and a ground engaging wheel rotatably connected to the wheel axle, the wheel including a wheel gear formed on an inner diameter;
a brush height adjustment assembly rotatably connected to the wheel axle including an arm having a first end and a second end, the first end including a connection device to selectively engage one of the apertures, and a brush shaft rotatably connected to the arm between the first end and the wheel axle, the brush shaft including a drive gear; and a swing arm rotatably connected to the wheel axle including a first end and a second end, the first end connected to a biasing element that is connected at an opposite end to the arm, the second end including a rotatably connected idler gear that meshingly engages the wheel gear, the swing arm is pivotally movable about the wheel axle between a first position and a second position, the first position is defined by the idler gear meshingly engaging the drive gear and the second position is defined by the idler gear disengaged from the drive gear.

2. The lawn sweeper of claim 1, further comprising a dust cover connected to the arm to enclose the swing arm and drive gear.

3. The lawn sweeper of claim 1, further comprising a bearing element connected to the arm to receive the brush shaft therethrough.

4. The lawn sweeper of claim 3, wherein the drive gear is secured to a distal end of the brush shaft that extends through the bearing element.

5. The lawn sweeper of claim 1, wherein the biasing element applies a force to the swing arm to normally dispose the swing arm in the first position.

6. The lawn sweeper of claim 1, further comprising a control mechanism connected to the second end of the swing arm that is movable from an engagement position to a disengagement position, the engagement position defined when the swing arm is disposed in the first position and the disengagement position defined when a force of the biasing element has been overcome by the control mechanism such that the swing arm is disposed in the second position.

7. The lawn sweeper of claim 1, further comprising a second arm rotatably connected to an opposite wheel axle connected to an opposite end panel disposed at an opposed longitudinal end of the central portion, the second arm including a first end and the brush shaft rotatably connected to the second arm between the first end and the opposite wheel axle, the brush shaft including a second drive gear, and a second swing arm rotatably connected to the opposite wheel axle including a first end and a second end, the first end connected to a second biasing element that is connected at an opposite end to the second arm, the second end including a rotatably connected second idler gear that meshingly engages a second wheel gear formed on an inner diameter of a second wheel connected to the opposite wheel axle, the second swing arm is movable between a first position and a second position, the first position defined by the second idler gear meshingly engaging the second drive gear and the second position defined by the second idler gear disengaged from the second drive gear, wherein the swing arm and the second swing arm are independently movable.

8. The lawn sweeper of claim 7, further comprising a control mechanism connected to the second end of the swing arm and the second swing arm so that each is movable from an engagement position to a disengagement position, the engagement position defined when the swing arm and the second swing arm are disposed in the first position and the disengagement position defined when a force of the biasing element and the second biasing element have been overcome by the second control mechanism such that the swing arm and the second swing arm are disposed in the second position.

9. A lawn sweeper comprising:
a housing including a central portion and an end panel at a longitudinal end of the central portion;

a brush shaft including a first end rotatably connected to the end panel and a drive gear;

a sweeper height adjustment assembly rotatably connected to the brush shaft including an arm having a first end and a second end, the first end connected to a cross bar adapted for connection to a height adjuster, and a wheel axle fixedly connected to the arm between the first end and the brush shaft, the wheel axle including a ground engaging wheel rotatably connected to the wheel axle, the wheel including a wheel gear formed on an inner diameter; and a swing arm rotatably connected to the wheel axle including a first end and a second end, the first end connected to a biasing element that is connected at an opposite end to the arm, the second end including a rotatably connected idler gear that meshingly engages the wheel gear, the swing arm is pivotally movable about the wheel axle between a first position and a second position, the first position is defined by the idler gear meshingly engaging the drive gear and the second position is defined by the idler gear disengaged from the drive gear.

10. The lawn sweeper of claim 9, further comprising a dust cover connected to the arm to enclose the swing arm and drive gear.

11. The lawn sweeper of claim 9, further comprising a bearing element connected to the end panel to receive the brush shaft therethrough.

12. The lawn sweeper of claim 11, wherein the drive gear is secured to a distal end of the brush shaft that extends through the bearing element.

13. The lawn sweeper of claim 9, wherein the biasing element applies a force to the swing arm to normally dispose the swing arm in the first position.

14. The lawn sweeper of claim 9, further comprising a control mechanism connected to the second end of the swing arm that is movable from an engagement position to a disengagement position, the engagement position defined when the swing arm is disposed in the first position and the disengagement position defined when a force of the biasing element has been overcome by the control mechanism such that the swing arm is disposed in the second position.

15. The lawn sweeper of claim 9, further comprising a second arm rotatably connected to a second end of the brush shaft connected to an opposite end panel disposed at an opposed longitudinal end of the central portion, the second arm including a first end connected to the cross bar and a second wheel axle fixedly connected to the second arm between the first end and the second end of the brush shaft including a second drive gear, and a second swing arm rotatably connected to the second wheel axle including a first end and a second end, the first end connected to a second biasing element that is connected at an opposite end to the second arm, the second end including a rotatably connected second idler gear that meshingly engages a second wheel gear formed on an inner diameter of a second wheel connected to the second wheel axle, the second swing arm is movable between a first position and a second position, the first position defined by the second idler gear meshingly engaging the second drive gear and the second position defined by the second idler gear disengaged from the second drive gear, wherein the swing arm and the second swing arm are independently movable.

16. The lawn sweeper of claim 15, further comprising a control mechanism connected to the second end of the swing arm and the second swing arm so that each is movable from an engagement position to a disengagement position, the engagement position defined when the swing arm and the second swing arm are disposed in the first position and the disengagement position defined when a force of the biasing element and the second biasing element have been overcome by the second control mechanism such that the swing arm and the second swing arm are disposed in the second position.

* * * * *